United States Patent
Huang et al.

(10) Patent No.: US 12,399,672 B2
(45) Date of Patent: Aug. 26, 2025

(54) IMAGE PROCESSOR CIRCUIT SUPPORTING TWO-PIXEL MODE AND IMAGE PROCESSING METHOD THEREOF

(71) Applicant: Realtek Semiconductor Corporation, Hsinchu (TW)

(72) Inventors: Hui Huang, Jiangsu Province (CN); Chia-Wei Yu, Hsinchu (TW); Tien-Hung Lin, Hsinchu (TW); Jiamei Feng, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 185 days.

(21) Appl. No.: 18/512,047

(22) Filed: Nov. 17, 2023

(65) Prior Publication Data
US 2024/0370222 A1 Nov. 7, 2024

(30) Foreign Application Priority Data
May 5, 2023 (CN) .......................... 202310494522.0

(51) Int. Cl.
*G06F 3/147* (2006.01)
*G06T 1/60* (2006.01)
*G09G 5/00* (2006.01)

(52) U.S. Cl.
CPC ............... *G06F 3/147* (2013.01); *G06T 1/60* (2013.01); *G09G 5/006* (2013.01); *G09G 2340/12* (2013.01)

(58) Field of Classification Search
CPC ........................................................ G06F 3/147
See application file for complete search history.

(56) References Cited

U.S. PATENT DOCUMENTS

| | | | |
|---|---|---|---|
| 2010/0171735 A1* | 7/2010 | Tung .................... | G09G 3/3685 345/213 |
| 2019/0272803 A1* | 9/2019 | Sharma .................... | G06T 3/053 |
| 2020/0090602 A1* | 3/2020 | Li ............................. | G09G 3/20 |

FOREIGN PATENT DOCUMENTS

CN 109417587 A 3/2019

* cited by examiner

*Primary Examiner* — Shivang I Patel
(74) *Attorney, Agent, or Firm* — CKC & Partners Co., LLC

(57) ABSTRACT

An image processor circuit includes a first processor circuit and a second processor circuit. In a two-pixel mode, the first processor circuit is configured to process a first part of first input data and the second processor circuit is configured to process a second part of the first input data to generate output data for a display panel to display. The first input data includes K columns, the first part includes 1st to Mth columns of the first input data, and the second part includes Nth to Kth columns of the first input data. N is less than K/2 and M is greater than K/2.

20 Claims, 5 Drawing Sheets

IMAGE PROCESSOR CIRCUIT SUPPORTING TWO-PIXEL MODE AND IMAGE PROCESSING METHOD THEREOF

RELATED APPLICATIONS

This application claims priority to Chinese Application Serial Number 202310494522.0, filed May 5, 2023, which is herein incorporated by reference.

BACKGROUND

Technical Field

The present disclosure relates to image processing technology. More particularly, the present disclosure relates to an image processor circuit and an image processing method.

Description of Related Art

With developments of technology, various image processing methods are developed. In some applications, if a display system supports a two-pixel mode, it needs to dispose two set of image processor circuits in a display system to process two pixels at the same time. This will increase the circuit area, and one of the two set of image processor circuits will be idle when the display system does not need to support the two-pixel mode.

SUMMARY

Some aspects of the present disclosure are to provide an image processor circuit. The image processor circuit includes a first processor circuit and a second processor circuit. In a two-pixel mode, the first processor circuit is configured to process a first part of first input data and the second processor circuit is configured to process a second part of the first input data to generate output data for a display panel to display. The first input data includes K columns, the first part includes 1st to Mth columns of the first input data, and the second part includes Nth to Kth columns of the first input data. N is less than K/2 and M is greater than K/2.

Some aspects of the present disclosure are to provide an image processing method. The image processing method includes following operations: in a two-pixel mode, receiving, by a first processor circuit, a first part of first input data and receiving, by a second processor circuit, a second part of the first input data; and processing, by the first processor circuit, the first part, and processing, by the second processor circuit, the second part to generate output data for a display panel to display. The first input data includes K columns, the first part includes 1st to Mth columns of the first input data, and the second part includes Nth to Kth columns of the first input data. N is less than K/2 and M is greater than K/2.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
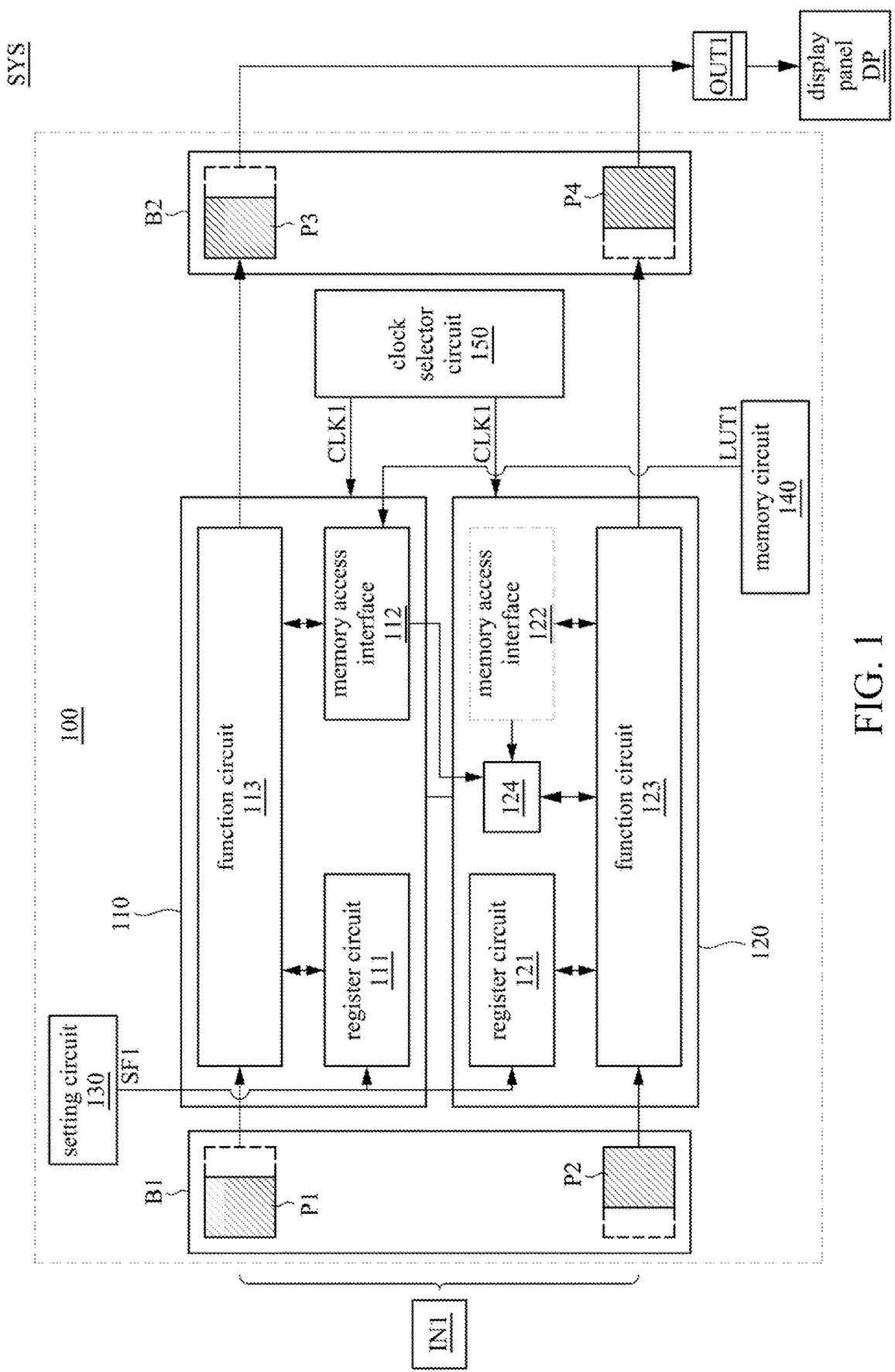
FIG. 1 is a schematic diagram of a display system in a two-pixel mode according to some embodiments of the present disclosure.

Reference is made to FIG. 1. FIG. 1 is a schematic diagram of a display system SYS in a two-pixel mode according to some embodiments of the present disclosure.

As illustrated in FIG. 1, the display system SYS includes an image processor circuit 100 and a display panel DP. The image processor circuit 100 is coupled to the display panel DP. The image processor circuit 100 can perform an image processing procedure on image input data to generate image output data for the display panel DP to display. For example, the display system SYS can operate in a two-pixel mode and a picture-in-picture mode.

In the two-pixel mode, the image processor circuit 100 can process two pixels in input data IN1 during one period to generate high pixel rate image output data OUT1. The high pixel rate image data can refer to high resolution image data or high frame rate image data. In other words, the image processor circuit 100 can process the data with higher pixel rate (higher resolution or higher frame rate).

As illustrated in FIG. 1, the image processor circuit 100 includes a buffer circuit B1, a processor circuit 110, a processor circuit 120, a setting circuit 130, a memory circuit 140, a clock selector circuit 150, and a buffer circuit B2. The processor circuit 110 and the processor circuit 120 are coupled to the buffer circuit B1, the setting circuit 130, the memory circuit 140, the clock selector circuit 150, and the buffer circuit B2.

The buffer circuit B1 can receive the input data IN1. In some embodiments, the buffer circuit B1 can be a line buffer, but the present disclosure is not limited thereto. The buffer circuit B1 can transmit a first par P1 of the input data IN1 to the processor circuit 110, and transmit a first par P2 of the input data IN1 to the processor circuit 120.

Figure 2:
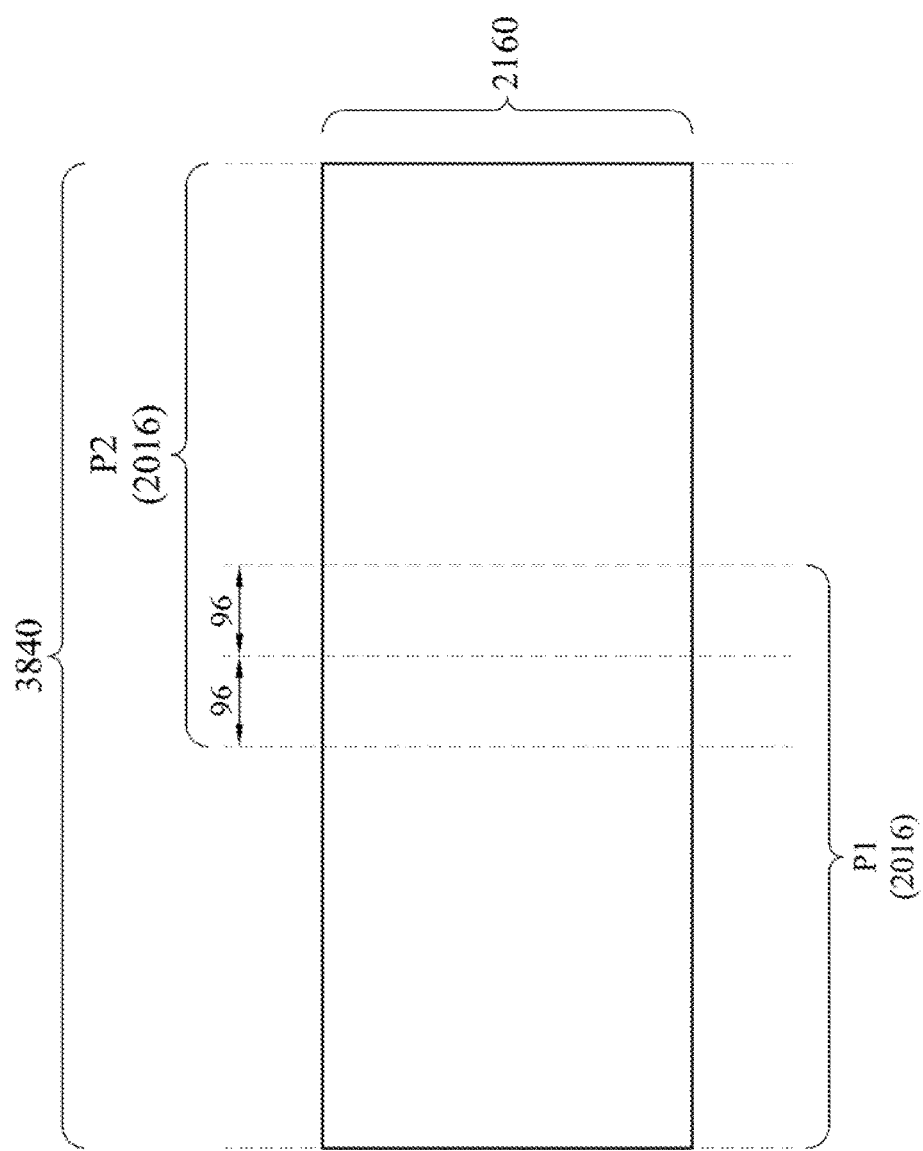
FIG. 2 is a schematic diagram of a first part of input data in FIG. 1 and a second part of the input data.

References are made to FIG. 1 and FIG. 2. FIG. 2 is a schematic diagram of the first part P1 of the input data IN in FIG. 1 and the second part P2 of the input data.

The input data IN1 can be from an image source. For example, the input data IN1 has 4K resolution, 120 Hz frame rate, and 600 MHz clock rate. A size of 4K is 3840×2160. Each of sizes of the first part P1 and the second part P2 can be 2016 (3840/2+96)×2160, in which the compensation lines 96 can be adjusted according to actual needs. In other words, the size of the first part P1 can be the same to the size of the second part P2. As illustrated in FIG. 2, the first part P1 includes 1st column to 2016th column of the input data IN1, and the second part P2 includes 1825th column to 3840th column of the input data IN1. Explained in another way, if the input data IN1 includes K columns, the first part P1 includes 1st column to Mth column of the input data IN1 (e.g., data on the left side of the display image) and the second part P2 includes Nth column to Kth column of the input data IN1 (e.g., data on the right side of the display image), in which K, M, and N are positive integers greater than 1, N is less than M, N is less than K/2, and M is greater than K/2. In other words, the first part P1 includes more than half of the data in the input data IN1, the second part P2 includes more than half of the data in the input data IN1, and part of the first part P1 is the same to part of the second part P2.

Reference is made to FIG. 1 again. The processor circuit 110 can perform an image processing procedure on the first part P1, and the processor circuit 120 can perform an image processing procedure on the second part P2.

The processor circuit 110 includes a register circuit 111, a memory access interface 112, and a function circuit 113. The function circuit 113 is coupled to the register circuit 111 and the memory access interface 112. The processor circuit 120 includes a register circuit 121, a memory access interface 122, and a function circuit 123. The function circuit 123 is coupled to the register circuit 121 and the memory access interface 122.

In some embodiments, the register circuit 111 or the register circuit 121 can include one or more registers. The registers can store data from the setting circuit 130. The data is, for example, a setting file SF1. The setting file SF1 can record image sizes or other setting values related to the image processing procedure. In some embodiments, the setting circuit 130 can be a Rbus wrapper circuit, but the present disclosure is not limited thereto.

In some embodiments, the memory access interface 112 or the memory access interface 122 can be, for example, a remote direct memory access (RDMA) interface. The memory access interface 112 or the memory access interface 122 can access data from the memory circuit 140. The data is, for example, a look-up table LUT1. The look-up table LUT1 can record color conversion relationships or other corresponding relationships related to the image processing procedure. In some embodiments, the memory circuit 140 can be a double data rate synchronous dynamic random access memory (DDR SRAM), but the present disclosure is not limited thereto.

In some embodiments, the function circuit 113 or the function circuit 123 can include one or more sub-function circuits. These sub-function circuits are configured to perform various image processing functions.

Since the processor circuit 110 and the processor circuit 120 process the two pixels in the same input data IN1 respectively in the two-pixel mode, the clock selector circuit 150 can generate two same clock signals CLK1 (e.g., 600 M Hz) and transmit the two same clock signals CLK1 to the processor circuit 110 and the processor circuit 120 respectively. Then, the processor circuit 110 and the processor circuit 120 perform the image processing procedures on the first part P1 and the second part P2 according to the same clock signals CLK1 respectively.

In addition, since the processor circuit 110 and the processor circuit 120 process the two pixels in the same input data IN1 respectively in the two-pixel mode, firmware can send out an instruction such that the setting circuit 130 transmits the setting file SF1 to the register circuit 111 at first, and hardware can utilize a broadcast method to duplicated whether-write-valid information (e.g., write_reg), write address information (e.g., write_add), and the setting file SF1 (e.g., write_data) in the register circuit 111 to the register circuit 121. In other words, in the two-pixel mode, the setting file SF1 in the register circuit 111 is the same to the setting file SF1 in the register circuit 121. In practical applications, the register circuit 111 or the register circuit 121 may include a plurality of registers, so utilizing the broadcast method to duplicate the setting file SF1 is more efficient and easy to design.

Regarding the writing function, it is assumed that the setting file SF1 to be written into the register circuit 111 is written to an address 0x181252xx and the setting file SF1 to be written into the register circuit 121 is written to an address 0x181352xx (the high bits are used to distinguish whether the data is written to the register circuit 111 or the register circuit 121, and the low bits are used to distinguish which register in the register circuit 111 or which register in the register circuit 121 the data is written into). As described above, the setting file SF1 to be written into the register circuit 111 can be set to be the same to the setting file SF1 to be written into the register circuit 121.

However, regarding the reading function, the system needs to distinguish whether to read files from the address 0x181252xx or to read files from the address 0x181352xx. In other words, the above broadcast method will not affect the reading function.

In addition, since the memory access interface 112 or the memory access interface 122 has less connection ports, the processor circuit 120 can further include a selector circuit 124 in some embodiments. The selector circuit 124 is coupled to the memory access interface 112 and the memory access interface 122. In the two-pixel mode, the memory circuit 140 can transmit the look-up table LUT1 to the memory access interface 112. Then, the selector circuit 124 can select and receive the look-up table LUT1 from the memory access interface 112 and transmit the look-up table LUT1 to the function circuit 123. At this time, the memory access interface 122 can be in an off state.

Thus, in the two-pixel mode, the processor circuit 110 can operate based on the clock signal CLK1, and the function circuit 113 can perform the image processing procedure on the first part P1 according to the setting file SF1 and the look-up table LUT1 to generate third part P3. At the same time, the processor circuit 120 can operate based on the clock signal CLK1, and the function circuit 123 can perform the image processing procedure on the second part P2 according to the setting file SF1 and the look-up table LUT1 to generate fourth part P4. Then, the buffer circuit B2 can receive the third part P3 and the fourth part P4. In some embodiments, the buffer circuit B2 can also be a line buffer, but the present disclosure is not limited thereto. A combination of the third part P3 and the fourth part P4 can be the output data OUT1.

When the input data IN1 has 4K resolution, 120 Hz frame rate, and 600 M Hz clock rate, the output data OUT1 also has 4K resolution, 120 Hz frame rate, and 600 M Hz clock rate. In other words, the image processor circuit 100 can process the two pixels at the same time to process the high pixel rate image. The output data OUT1 can be transmitted to the display panel DP, and the display panel DP can display the high pixel rate image according to the output data OUT1.

Since the first part P1 or the second part P2 includes neighbor pixels adjacent in a horizontal direction, the image processor circuit 100 can satisfy the requirement of the horizontal filter or the requirement of consideration of the neighbor pixels adjacent in the horizontal direction.

Figure 3:
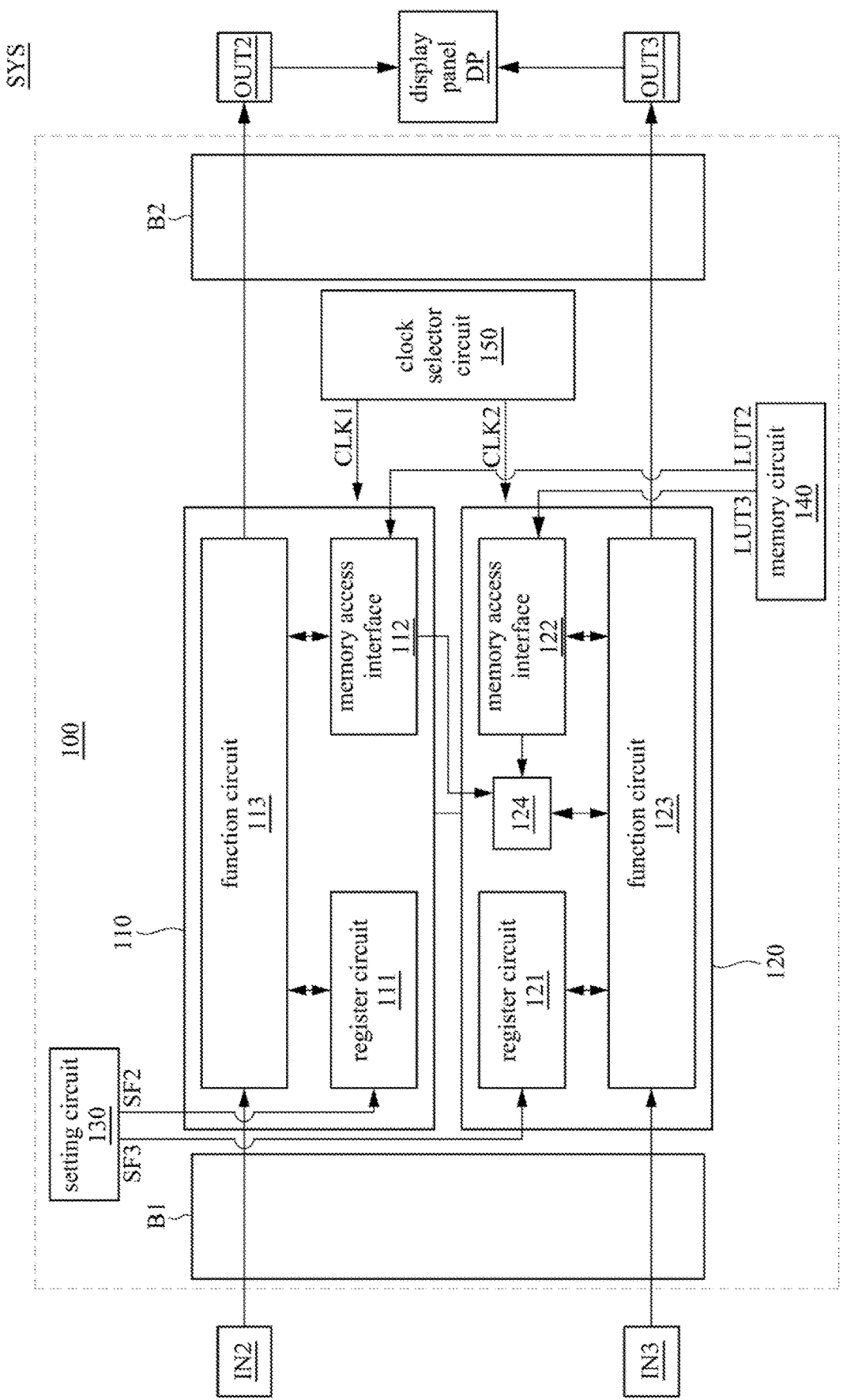
FIG. 3 is a schematic diagram of the display system in FIG. 1 in a picture-in-picture mode according to some embodiments of the present disclosure.

Reference is made to FIG. 3. FIG. 3 is a schematic diagram of the display system SYS in FIG. 1 in a picture-in-picture mode according to some embodiments of the present disclosure.

In the picture-in-picture mode, the image processor circuit 100 can process different input data IN2 and input data IN3 at the same time during one period to generate main-picture output data OUT2 and sub-picture output data OUT3. Accordingly, the display panel DP can display a main-picture image and a sub-picture image at the same time according to the main-picture output data OUT2 and the sub-picture output data OUT3.

The input data IN2 and the input data IN3 can be from different image sources. For example, the input data IN2 has 4K resolution, 60 Hz frame rate, and 600 M Hz clock rate, and the input data IN3 has 2K resolution, 60 Hz frame rate, and 150 M Hz clock rate, but the present disclosure is not limited thereto.

In the picture-in-picture mode, the buffer circuit B1 bypasses the input data IN2 to the processor circuit 110 and bypasses the input data IN3 to the processor circuit 120. Since the processor circuit 110 and the processor circuit 120 in the picture-in-picture mode process the different input data IN2 and input data IN3 respectively, the clock selector circuit 150 can generate different clock signals. The different clock signals are, for example, the clock signal CLK1 (e.g., 600 M Hz) and a clock signal CLK2 (e.g., 150 M Hz). Then, the clock selector circuit 150 transmits the clock signal CLK1 to the processor circuit 110 and transmit the clock signal CLK2 to processor circuit 120. Then, the processor circuit 110 performs the image processing procedure on the input data IN2 according to the clock signal CLK1, and the processor circuit 120 performs the image processing procedure on the input data IN3 according to the clock signal CLK2.

Since the processor circuit 110 and the processor circuit 120 in the picture-in-picture mode process the different input data IN2 and input data IN3 respectively, the setting circuit 130 can transmit a setting file SF2 to the register circuit 111 and transmit a setting file SF3 to the register circuit 121. In other words, in the picture-in-picture mode, the setting file SF2 in the register circuit 111 may be different from the setting file SF3 in the register circuit 121.

In addition, the memory circuit 140 can transmit a look-up table LUT2 to the memory access interface 112 and transmit a look-up table LUT3 to the memory access interface 122. In other words, in the picture-in-picture mode, the look-up table LUT2 accessed by the memory access interface 112 may be different from the look-up table LUT3 accessed by the memory access interface 122.

Thus, in the picture-in-picture mode, the processor circuit 110 can operate based on the clock signal CLK1, and the function circuit 113 can perform the image processing procedure on the input data IN2 according to the setting file SF2 and the look-up table LUT2 to generate the main-picture output data OUT2. At the same time, the processor circuit 120 can operate based on the clock signal CLK2, and the function circuit 123 can perform the image processing procedure on the input data IN3 according to the setting file SF3 and the look-up table LUT3 to generate the sub-picture output data OUT3. When the input data IN2 has 4K resolution, 60 Hz frame rate, and 600 M Hz clock rate, the main-picture output data OUT2 also has 4K resolution, 60 Hz frame rate, and 600 M Hz clock rate. When the input data IN3 has 2K resolution, 60 Hz frame rate, and 150 M Hz clock rate, the sub-picture output data OUT3 also has 2K resolution, 60 Hz frame rate, and 150 M Hz clock rate. The main-picture output data OUT2 and the sub-picture output data OUT3 can be transmitted to the display panel DP, and the display panel DP can display the main-picture image according to the main-picture output data OUT2 and display the sub-picture image according to the sub-picture output data OUT3. In other words, the display panel DP can display two independent images (the main-picture image and the sub-picture image) at the same time.

Figure 4:
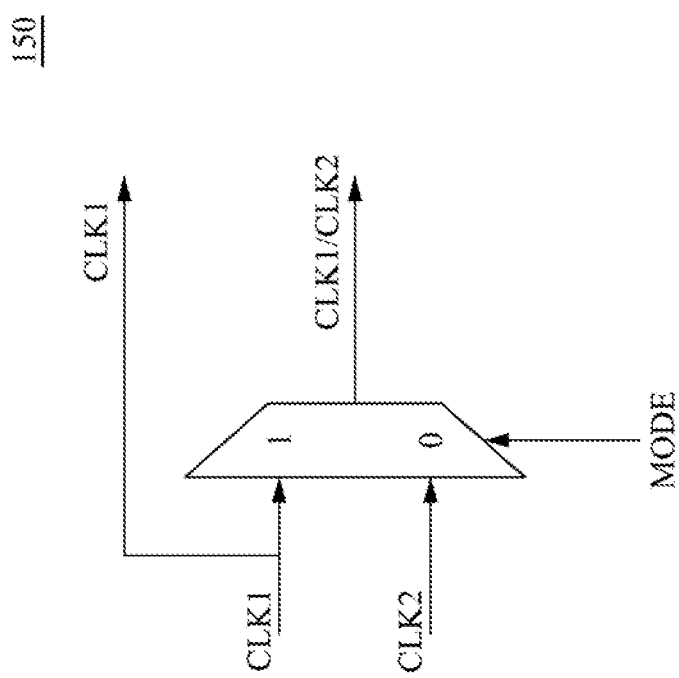
FIG. 4 is a schematic diagram of a clock selector circuit according to some embodiments of the present disclosure.

Reference is made to FIG. 4. FIG. 4 is a schematic diagram of the clock selector circuit 150 in FIG. 1 according to some embodiments of the present disclosure.

As illustrated in FIG. 4, the clock selector circuit 150 is implemented by a multiplexer, but the present disclosure is not limited thereto. The clock selector circuit 150 includes a first input terminal (corresponding to a value 1), a second input terminal (corresponding to a value 0), a control terminal, and an output terminal. The first input terminal is configured to receive the clock signal CLK1 and transmit the clock signal CLK1 to the processor circuit 110 in FIG. 1 or FIG. 2. The second input terminal is configured to receive the clock signal CLK2. The control terminal is configured to receive a mode signal MODE. The output terminal is coupled to the processor circuit 120 in FIG. 1 or FIG. 2.

In the two-pixel mode (FIG. 1), the mode signal MODE in FIG. 4 can correspond to the value 1. Accordingly, in addition to transmitting the clock signal CLK1 directly to the processor circuit 110 in FIG. 1, the clock selector circuit 150 selects the clock signal CLK1 and outputs the clock signal CLK1 to the processor circuit 120 in FIG. 1 such that the processor circuit 110 and the processor circuit 120 in FIG. 1 operate based on the same clock signal.

In the picture-in-picture mode (FIG. 3), the mode signal MODE in FIG. 4 can correspond to the value 0. Accordingly, in addition to transmitting the clock signal CLK1 directly to the processor circuit 110 in FIG. 3, the clock selector circuit 150 selects the clock signal CLK2 and outputs the clock signal CLK2 to the processor circuit 120 in FIG. 3 such that the processor circuit 110 and the processor circuit 120 in FIG. 3 operate based on the different clock signals.

In some related approaches, if a display system supports the two-pixel mode, it needs to dispose two set of image processor circuits in the display system to process two pixels at the same time. This will increase the circuit area and cannot consider two adjacent pixels.

Compared to the above related approaches, in the present disclosure, it merely needs to dispose one image processor circuit 100 to process two pixels at the same time in the two-pixel mode. In addition, since the first part P1 or the second part P2 includes neighbor pixels in the horizontal direction, the image processor circuit 100 of the present disclosure can satisfy the requirement of the horizontal filter or the requirement of consideration of the neighbor pixels adjacent in the horizontal direction. In addition, the present disclosure can process the main-picture data and the sub-picture data at the same time in the picture-in-picture mode. Accordingly, this does not increase excessively (or increase slightly) the circuit area and does not make the circuit to be idle.

Figure 5:
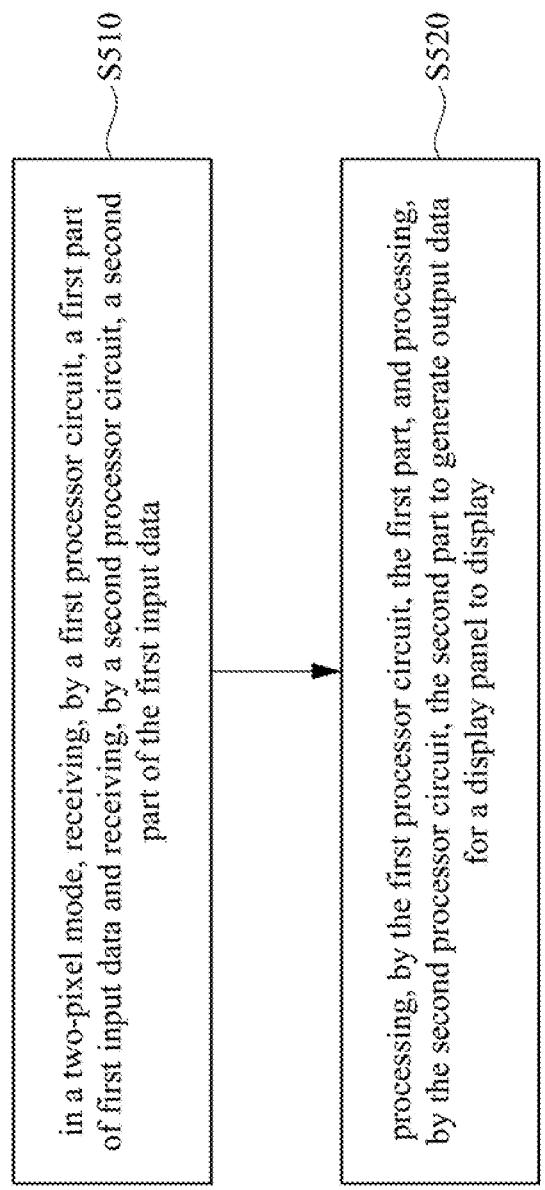
FIG. 5 is a flow diagram of an image processing method according to some embodiments of the present disclosure.

Reference is made to FIG. 5. FIG. 5 is a flow diagram of an image processing method 500 according to some embodiments of the present disclosure. As illustrated in FIG. 5, the image processing method 500 includes operation S510 and operation S520.

In some embodiments, the image processing method 500 can be applied to the image processor circuit 100 in FIG. 1 and FIG. 3, but the present disclosure is not limited thereto. For better understanding, the image processing method 500 is described in following paragraphs with reference to the image processor circuit 100 in FIG. 1 and FIG. 3.

In operation S510, in the two-pixel mode, the processor circuit 110 receives the first part P1 of the input data IN1, and the processor circuit 120 receives the second part P2 of the input data IN1. In some embodiments, as illustrated in FIG. 2, the input data IN1 includes 3840 columns, the first part P1 includes 1st column to 2016th column of the input data IN1, and the second part P2 includes 1825th column to 3840th column of the input data IN1.

In operation S520, the processor circuit 110 processes the first part P1 and the processor circuit 120 processes the second part P2 to generate the output data OUT1 for the display panel DP to display.

Since the details of operation S510 and operation S520 are described in above paragraphs related to FIG. 1 and FIG. 2, they are not described herein again.

As described above, in the present disclosure, since the first part or the second part of the input data includes neighbor pixels in the horizontal direction, the image processor circuit can satisfy the requirement of the horizontal filter or the requirement of consideration of the neighbor pixels adjacent in the horizontal direction.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processor circuit, comprising:
a first processor circuit; and
a second processor circuit,
wherein in a two-pixel mode, the first processor circuit is configured to process a first part of first input data and the second processor circuit is configured to process a second part of the first input data to generate output data for a display panel to display,
wherein the first input data comprises K columns, the first part comprises 1st to Mth columns of the first input data, and the second part comprises Nth to Kth columns of the first input data, wherein N is less than K/2 and M is greater than K/2.

2. The image processor circuit of claim 1, further comprising:
a first buffer circuit configured to receive the first input data, transmit the first part to the first processor circuit, and transmit the second part to the second processor circuit.

3. The image processor circuit of claim 2, further comprising:
a second buffer circuit configured to receive a third part from the first processor circuit and corresponding to the first part, and receive a fourth part from the second processor circuit and corresponding to the second part, wherein a combination of the third part and the fourth part is the output data.

4. The image processor circuit of claim 1, wherein in a picture-in-picture mode, the first processor circuit is configured to process second input data to generate main-picture output data, and the second processor circuit is configured to process third input data to generate sub-picture output data.

5. The image processor circuit of claim 4, wherein the first processor circuit receives a first clock signal, wherein the image processor circuit further comprises:
a clock selector circuit configured to receive the first clock signal and a second clock signal and controlled by a mode signal,
wherein when the mode signal corresponds to the two-pixel mode, the clock selector circuit outputs the first clock signal to the second processor circuit,
wherein when the mode signal corresponds to the picture-in-picture mode, the clock selector circuit outputs the second clock signal to the second processor circuit.

6. The image processor circuit of claim 5, wherein the second clock signal is different from the first clock signal.

7. The image processor circuit of claim 4, wherein the first processor circuit comprises:
a first register circuit configured to store a first setting file;
a first memory access interface configured to access a first look-up table; and
a first function circuit coupled to the first register circuit and the first memory access interface.

8. The image processor circuit of claim 7, wherein the second processor circuit comprises:
a second register circuit configured to store a second setting file;
a second memory access interface configured to access a second look-up table; and
a second function circuit coupled to the second register circuit and the second memory access interface.

9. The image processor circuit of claim 8, further comprising:
a setting circuit, wherein in the two-pixel mode, the setting circuit is configured to transmit the first setting file to the first register circuit and utilize a broadcast method to duplicate the first setting file to the second register circuit to be the second setting file; and
a memory circuit, wherein in the two-pixel mode, the memory circuit is configured to transmit the first look-up table to the first memory access interface,
wherein the second processor circuit further comprises:
a selector circuit, wherein in the two-pixel mode, the selector circuit is configured to receive the first look-up table from the first memory access interface and transmit the first look-up table to the second function circuit.

10. The image processor circuit of claim 9, wherein in the picture-in-picture mode, the setting circuit is configured to transmit the first setting file to the first register circuit and transmit the second setting file to the second register circuit, wherein in the picture-in-picture mode, the memory circuit is configured to transmit the first look-up table to the first memory access interface and transmit the second look-up table to the second memory access interface.

11. An image processing method, comprising:
in a two-pixel mode, receiving, by a first processor circuit, a first part of first input data and receiving, by a second processor circuit, a second part of the first input data; and
processing, by the first processor circuit, the first part, and processing, by the second processor circuit, the second part to generate output data for a display panel to display,
wherein the first input data comprises K columns, the first part comprises 1st to Mth columns of the first input data, and the second part comprises Nth to Kth columns of the first input data, wherein N is less than K/2 and M is greater than K/2.

12. The image processing method of claim 11, further comprising:
receiving, by a first buffer circuit, the first input data;
transmitting, by the first buffer circuit, the first part to the first processor circuit; and transmitting, by the first buffer circuit, the second part to the second processor circuit.

13. The image processing method of claim 12, further comprising:
receiving, by a second buffer circuit, a third part from the first processor circuit and corresponding to the first part and receiving, by the second buffer circuit, a fourth part from the second processor circuit and corresponding to the second part,
wherein a combination of the third part and the fourth part is the output data.

14. The image processing method of claim 11, further comprising:
in a picture-in-picture mode, processing, by the first processor circuit, second input data to generate main-picture output data; and
processing, by the second processor circuit, third input data to generate sub-picture output data.

15. The image processing method of claim 14, further comprising:
receiving, by the first processor circuit, a first clock signal;
receiving, by a clock selector circuit, the first clock signal and a second clock signal, wherein the clock selector circuit is controlled by a mode signal;
when the mode signal corresponds to the two-pixel mode, outputting, by the clock selector circuit, the first clock signal to the second processor circuit; and
when the mode signal corresponds to the picture-in-picture mode, outputting, by the clock selector circuit, the second clock signal to the second processor circuit.

16. The image processing method of claim 15, wherein the second clock signal is different from the first clock signal.

17. The image processing method of claim 14, further comprising:
storing, by a first register circuit, a first setting file; and
accessing, by a first memory access interface, a first look-up table,
wherein a first function circuit is coupled to the first register circuit and the first memory access interface.

18. The image processing method of claim 17, further comprising:
storing, by a second register circuit, a second setting file; and
accessing, by a second memory access interface, a second look-up table,
wherein a second function circuit is coupled to the second register circuit and the second memory access interface.

19. The image processing method of claim 18, further comprising:
in the two-pixel mode, transmitting, by a setting circuit, the first setting file to the first register circuit;
utilizing a broadcast method to duplicate the first setting file to the second register circuit to be the second setting file; and
transmitting, by a memory circuit, the first look-up table to the first memory access interface; and
receiving, by a selector circuit, the first look-up table from the first memory access interface and transmitting, by the selector circuit, the first look-up table to the second function circuit.

20. The image processing method of claim 19, further comprising:
in the picture-in-picture mode, transmitting, by the setting circuit, the first setting file to the first register circuit and transmitting, by the setting circuit, the second setting file to the second register circuit; and
transmitting, by the memory circuit, the first look-up table to the first memory access interface and transmitting, by the memory circuit, the second look-up table to the second memory access interface.

* * * * *